US010294822B2

(12) United States Patent
Caruel et al.

(10) Patent No.: US 10,294,822 B2
(45) Date of Patent: May 21, 2019

(54) TURBINE ENGINE NACELLE FITTED WITH A HEAT EXCHANGER

(71) Applicant: AIRCELLE, Gonfreville l'Orcher (FR)

(72) Inventors: Pierre Caruel, Le Havre (FR); Franck Zaganelli, Fontainebleau (FR); Patrick Gonidec, Bretx (FR); Olivier Kerbler, Antony (FR)

(73) Assignee: AIRCELLE, Gonfreville l'Orcher (FR)

( * ) Notice: Subject to any disclaimer, the term of this patent is extended or adjusted under 35 U.S.C. 154(b) by 1274 days.

(21) Appl. No.: 14/471,323

(22) Filed: Aug. 28, 2014

(65) Prior Publication Data
US 2014/0369812 A1 Dec. 18, 2014

Related U.S. Application Data

(63) Continuation of application No. PCT/FR2013/050290, filed on Feb. 13, 2014.

(30) Foreign Application Priority Data

Mar. 2, 2012 (FR) .................... 12 51942

(51) Int. Cl.
F01D 25/24 (2006.01)
B64D 15/04 (2006.01)
(Continued)

(52) U.S. Cl.
CPC ............ F01D 25/24 (2013.01); B64D 15/04 (2013.01); B64D 33/02 (2013.01); B64D 33/10 (2013.01);
(Continued)

(58) Field of Classification Search
CPC ........ B64D 15/00; B64D 15/02; B64D 15/04; B64D 15/06; B64D 2033/0233; B64D 33/10; F02C 7/14; F02C 7/047; F02C 7/12; F05D 2260/213; F05D 2260/605; F02K 3/06
See application file for complete search history.

(56) References Cited

U.S. PATENT DOCUMENTS 2,820,601 A * 1/1958 Crawford ................. B64C 5/08
244/134 B
3,981,466 A * 9/1976 Shah ....................... B64D 15/02
165/42
(Continued)

FOREIGN PATENT DOCUMENTS

EP 1 479 889 A2 11/2004

OTHER PUBLICATIONS

International Search Report dated Jun. 14, 2013 in International Application No. PCT/FR2013/050290.

Primary Examiner — Justin D Seabe
Assistant Examiner — Julian B Getachew
(74) Attorney, Agent, or Firm — Burris Law, PLLC

(57) ABSTRACT

A nacelle of a turbine engine includes an external cowling, an internal cowling, and a heat exchanger associated with at least one circulation duct for a fluid. In particular, the circulation duct forms a recirculation loop through the heat exchanger, and the recirculation loop includes at least one circulation area extending at least partially along the external cowling in contact with a wall of the external cowling so as to allow exchange of heat by conduction with the air outside the nacelle.

18 Claims, 6 Drawing Sheets

(51) Int. Cl.
  *B64D 33/10* (2006.01)
  *F02C 7/047* (2006.01)
  *F02C 7/12* (2006.01)
  *F02K 3/06* (2006.01)
  *B64D 33/02* (2006.01)

(52) U.S. Cl.
  CPC .............. *F02C 7/047* (2013.01); *F02C 7/12* (2013.01); *F02K 3/06* (2013.01); *B64D 2033/0233* (2013.01); *F05D 2240/14* (2013.01); *F05D 2260/213* (2013.01); *Y02T 50/676* (2013.01)

(56) References Cited

U.S. PATENT DOCUMENTS

| | | | | |
|---|---|---|---|---|
| 4,482,114 A | * | 11/1984 | Gupta | B64D 15/02 244/118.5 |
| 4,782,658 A | | 11/1988 | Perry | |
| 5,683,062 A | * | 11/1997 | Spiro | B64D 33/02 244/121 |
| 6,457,676 B1 | * | 10/2002 | Breer | F02C 7/047 244/134 B |
| 6,688,558 B2 | * | 2/2004 | Breer | B64D 15/04 244/134 B |
| 7,398,641 B2 | * | 7/2008 | Stretton | F02C 7/047 244/134 B |
| 7,454,894 B2 | * | 11/2008 | Larkin | F01D 25/12 60/226.1 |
| 2008/0053100 A1 | * | 3/2008 | Venkataramani | F02C 7/047 60/772 |

\* cited by examiner ized. More specifically, document U.S. Pat. No. 4,782,658 describes an anti-icing system using outside air collected by a scoop and heated through an air/oil exchanger to help with the de-icing. Such a system allows a better control of the exchanged thermal energies, but the presence of scoops in the outer surface of the nacelle causes a loss in aerodynamic performances.

TURBINE ENGINE NACELLE FITTED WITH A HEAT EXCHANGER

CROSS-REFERENCE TO RELATED APPLICATIONS

This application is a continuation of International Application No. PCT/FR 2013/050290, filed on Feb. 13, 2013, which claims the benefit of FR 12/51942, filed on Mar. 2, 2012. The disclosures of the above applications are incorporated herein by reference.

FIELD

The present disclosure relates to a turbine engine nacelle fitted with a system for cooling the motor oil.

BACKGROUND

The statements in this section merely provide background information related to the present disclosure and may not constitute prior art.

An aircraft is propelled by one or several propulsion assemblies each comprising a turbine engine housed in a tubular nacelle. Each propulsion assembly is fastened to the aircraft by a mast usually located under or on a wing or at the fuselage.

A nacelle usually has a structure comprising an air inlet upstream of the motor, a median section intended to surround a fan or the compressors of the turbine engine and its casing, a downstream section able to accommodate thrust reversal means and intended to surround the combustion chamber of the turbine engine, and is usually terminated by an ejection nozzle of which the exit is located downstream of the turbine engine.

Generally, the turbine engine comprises a system of blades (compressor and possibly fan or non-shrouded propeller) driven in rotation by a gas generator through an assembly of transmission means.

A system for distributing lubricant is provided to provide a good lubrication of these transmission means and to cool them.

As a result, the lubricant must then also be cooled by means of a heat exchanger.

To this end, a first known method consists in cooling the lubricant by circulating through an air/oil exchanger using the air collected in a secondary vein (called cold flow) of the nacelle or in one of the first stages of the compressor.

The collection and circulation of air through this exchanger, disrupts the stream of air flow and causes additional head losses (drag) which is not desirable.

It has in particular, been calculated that in the case of a fan motor with reducer, it could represent losses equivalent to around 1% of fuel consumption.

Another solution has appeared within the context of nacelle anti-icing systems.

In fact, in flight, according to the conditions of temperature and humidity, ice may form on the nacelle, in particular at the outer surface of the air inlet lip equipping the air inlet section.

The presence of ice or frost modifies the aerodynamic properties of the air inlet and disrupts the movement of the air towards the fan. Moreover, the forming of frost on the air inlet of the nacelle and the ingestion of ice by the motor in the event of separation of ice blocks may damage the motor or the airfoil, and pose a threat to flight safety.

A solution to device the outer surface of the nacelle consists in preventing ice from forming on this outer surface by maintaining the concerned surface at sufficient temperature.

Thus, the heat of the lubricant may be used to heat the outer surfaces of the nacelle, the lubricant being as a result cooled and able to be re-sued in the lubrication circuit.

Documents U.S. Pat. No. 4,782,658 and EP 1 479 889, in particular, describe the implementation of such anti-icing systems using the heat from the motor lubricant.

More specifically, document U.S. Pat. No. 4,782,658 describes an anti-icing system using outside air collected by a scoop and heated through an air/oil exchanger to help with the de-icing. Such a system allows a better control of the exchanged thermal energies, but the presence of scoops in the outer surface of the nacelle causes a loss in aerodynamic performances.

Document EP 1 479 889 itself describes, an anti-icing system of an air inlet structure of turbojet engine nacelle using a closed circuit air/oil exchanger, the heated internal air of the air inlet structure being put in forced convection by a ventilator.

It is worth noting that the air inlet structure is hollow and forms a closed chamber of de-icing air circulation heated by the exchanger disposed inside this chamber.

Thus, the thermal energy available for the de-icing depends on the temperature of the lubricant.

Furthermore, the exchange surface of the air inlet structure is stationary and limited and the actually dissipated energy substantially depends on the heat required for de-icing and hence on external conditions.

It ensues that the cooling of the lubricant, as well as the temperature at which the air inlet is maintained, are difficult to control.

As is noted, the proposed systems are difficult to adjust depending on the quantity of heat to be dissipated and the actual de-icing needs and are not suitable according to the actual needs and in particular the flight phases. Moreover, the outer surface of the lip alone may not be enough to dissipate all the heat conducted by the lubricant, particularly if the turbine engine is equipped with a reducer which dissipates a large quantity of heat.

Hence, there is a need for a system which allows controlling and optimizing both the cooling performances of the motor lubricant and the de-icing performances.

SUMMARY

The present disclosure provides a nacelle of turbine engine having a substantially tubular structure and comprising at least one outer fairing defining an outer aerodynamic surface and at least one inner fairing defining an internal aerodynamic flow surface through the turbine engine, said outer and inner surfaces being connected upstream by a leading edge wall forming an air inlet lip, said nacelle of turbine engine comprising at least one heat exchanger between a first fluid to be heated and a second fluid to be cooled, characterized in that the exchanger is associated with at least one circulation duct of the first fluid to be heated forming at least one recirculation loop through the exchanger and comprising at least one circulation area of the first fluid extending at least partially along the outer fairing in contact with at least one wall of said outer fairing in such a manner as to allow a heat exchange by conduction with the outside air of the nacelle.

By recirculation loop, it should be understood a circuit recirculating the totality of the fluid. This implies that an inlet point and an outlet point through the exchanger and the recirculation duct connect the outlet point to the inlet point.

Thus, the heat recovered by the first fluid of the motor lubricating oil, for example, or by another hot fluid to be cooled, may be dissipated at the outer fairing by conduction.

This outer fairing naturally has an available thermal exchange surface which is more important than the sole surface of the air inlet lip, for example, and thus makes the thermal dissipation more efficient and better controllable.

Furthermore, this surface not being a leading edge, it is less directly exposed to frost and the stream of outer air thus provides a more constant thermal dissipation.

In an advantageous manner, the circulation area of the first fluid at the outer fairing is carried out by means of at least one dual wall of said outer fairing having an internal space able to allow the circulation of the first fluid.

In one form, the circulation duct of the first fluid is equipped with forced circulation means of said first fluid.

Advantageously, the nacelle comprises at least one circulation duct of the first fluid through at least one chamber of the inlet lip with a view to allowing the de-icing thereof.

Thus, by providing several heat dissipation areas, it is possible to improve the quantity of heat distributed to each area according to the actual de-icing needs and the temperature of the fluid and obviously the outside temperature.

In the case where the lip does not need de-icing, the heat to be dissipated may be directed towards the circulation area at the outer fairing, thus reducing the risk of overheating the materials of the air inlet lip. Reciprocally, in the case where the needs for de-icing heat are more important, the fluid may be preferentially directed towards the lip structure.

Advantageously still, the circulation duct of the first fluid through the air inlet lip comprises at least one recirculation portion through the exchanger.

In order to follow more closely the de-icing needs, the nacelle comprises at least one complementary means for heating the first fluid, in particular electric heating means.

Thus, in the case where the temperature of the fluid to be cooled, in particular the motor lubricant, is insufficient or prevents collecting enough heat for the de-icing needs, the first fluid may be heated at the required temperature by the complementary heating means.

According to a first form, the additional heating means is substantially located at the exchanger.

According to a second form, possibly complementary, the additional heating means is not disposed inside the exchanger and instead disposed at a particular circulation duct of the first fluid.

Advantageously, the circulation duct of the first fluid is equipped with at least one regulating valve.

In another form, the first fluid is air, the heat exchanger being an air/oil type exchanger, and the oil is a motor lubricant of the turbine engine.

Alternatively, the first fluid is a liquid. Advantageously still, the first fluid undergoes at least one phase change during its circulation.

In still another from, the circulation duct of the first fluid comprises at least one means for collecting the first fluid, being in particular in the form of a collecting scoop advantageously placed downstream of the fan or downstream of one of the first stages of the compressor, the scoop being preferably equipped with at least one regulating valve.

In an advantageously complementary manner, the circulation duct of the first fluid comprises at least one means for discharging the first fluid, being in the form of an outlet scoop, the scoop being equipped with at least one regulating valve.

The collecting and outlet scoops may open either at the outer fairing (preferentially) or at the inner fairing.

According to another form, the outer fairing of the nacelle comprises an outer fairing of a pylon of turbine engine, and the circulation area of the recirculation loop of the first fluid extending at least partially along the outer fairing of the pylon, for example, on a surface intended to be exposed to the outer air flow around the nacelle.

The present disclosure also relates to an aircraft propulsion assembly comprising a turbine engine housed inside a nacelle, characterized in that the nacelle is a nacelle according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
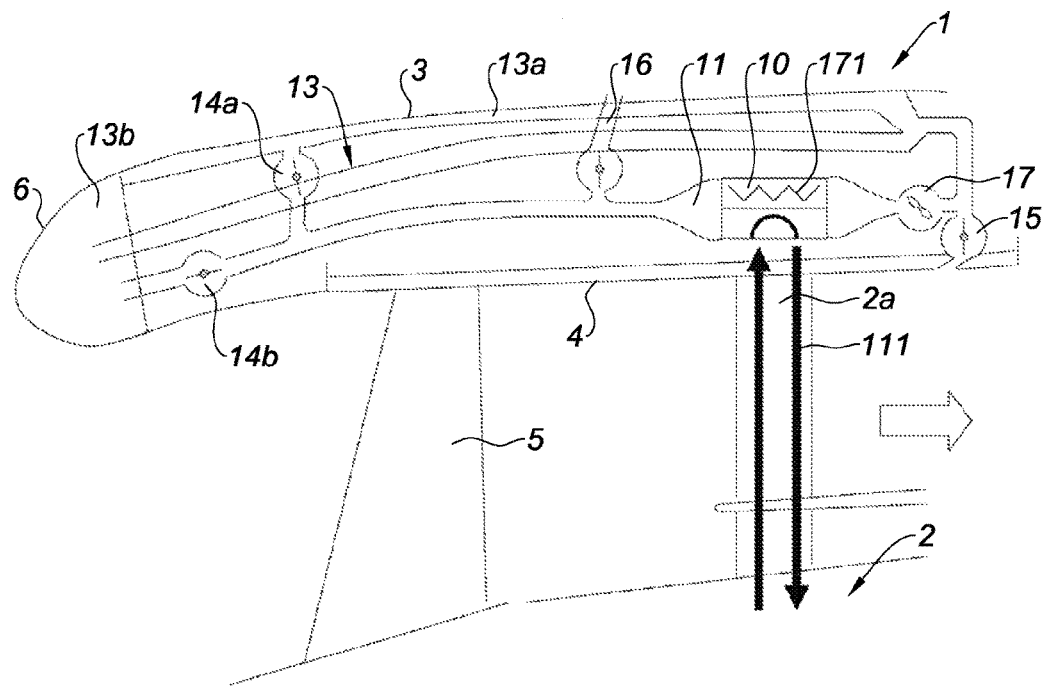
FIG. 1 is a partial schematic representation of an upstream portion of a turbojet engine nacelle (fan turbine engine) according to the present disclosure comprising a circuit for cooling the motor lubricating oil.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A nacelle 1 of turbine engine constitutes a housing for the turbine engine 2 and has a substantially tubular structure comprising an outer fairing 3 defining an outer aerodynamic surface and an inner fairing 4 an internal aerodynamic flow surface through the turbine engine and in particular a fan 5.

The outer 3 and inner 4 fairings are connected upstream by a wall of the air inlet lip 6 constituting a leading edge of the nacelle.

The outer 3 and inner 4 fairings of the nacelle define an internal space accommodating a system for cooling the motor lubricant of the turbine engine 2.

The cooling system comprises a heat exchanger 10 of air/oil type supplied, on the one hand, by the lubricant (second fluid) to be cooled, and on the other hand, by the air (first fluid) to be heated.

The lubricant is brought to the exchanger by a pumping system of the turbine engine (not visible) and a circulation duct 111 crossing a support arm 2a of the turbine engine and crossing the air circulation stream.

The cooling air circulates through the exchanger 10 where it recovers part of the thermal energy of the lubricant (which cools it) and through a system 13 of circulation ducts bringing it at the cold areas where it is able to evacuate its thermal energy before a new cycle through the exchanger.

The cooling air may circulate in closed circuit or may be renewed by collecting and evacuating air.

The system 13 of circulation ducts will be described in detail.

The system 13 of circulation ducts has a first end 11 connected to an air outlet of the exchanger 10 and a second end 12 connected to an air inlet of the exchanger 10.

Thus, the first end 11 receives from the exchanger 11 the air heated by the lubricant with a view to diffusing it through the circulation ducts, and the second end 12 receives the cold air supplying the exchanger 10 with a view to be heated by the lubricant.

Between the first end 11 and its second end 12, the system of circulation ducts comprises several circulation areas of the heated air.

In accordance with the present disclosure, the system 13 of circulation ducts comprises an air circulation loop forming a recirculation loop through the exchanger, that is to say, extending between the first end 11 and the second end 12 in such a manner as to allow the continuous recirculation of the air through the exchanger, said recirculation loop comprising a circulation area 13a of the air extending along the outer fairing 3 in contact with a wall of said fairing in such a manner as to allow an exchange of heat by convection with the outside air of the nacelle.

Figure 6:
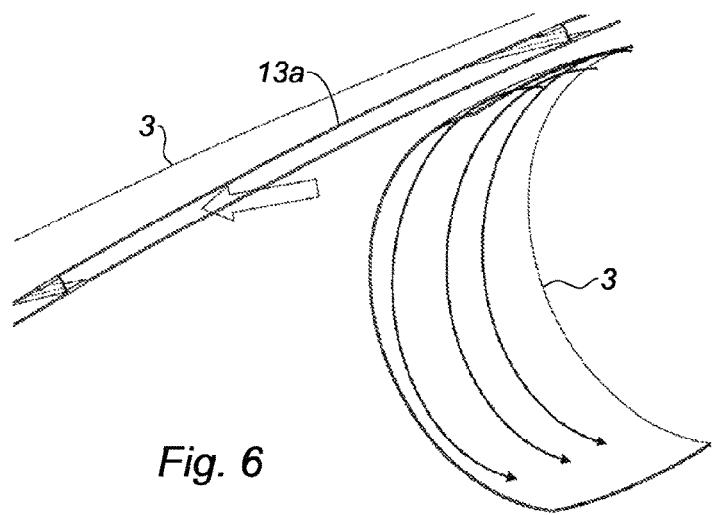
FIGS. 6 and 7 are schematic representations of a dual wall of the outer fairing allowing the circulation of the first fluid.
Figure 7:
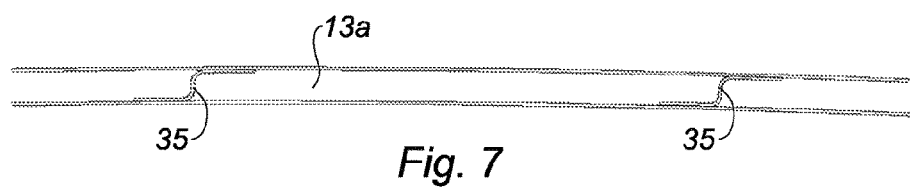

The circulation area 13a will be more particularly achieved in an internal space of a dual wall of said outer fairing 3 (see FIGS. 6 and 7).

The system 13 of circulation ducts further comprises another circulation loop, namely a circulation loop through a de-icing chamber 13b of the air inlet lip 6.

The circulation loops 13a and 13b are in addition each equipped with a corresponding regulating valve 14a, 14b.

The system 13 of circulation ducts is equipped at its end 12 with a scoop 15 for collecting cold air opening at the inner fairing 4 in the stream of air circulation of the turbojet engine and downstream of the fan 5 or downstream of one of the first stages of the compressor of the turbine engine.

The system 13 of circulation ducts is equipped at its end 11 with an air outlet of the exchanger of an outlet duct comprising a discharge scoop 16 opening at the outer fairing 3.

The system 13 is finally completed at its end 12 supplying the exchanger 10 of a ventilator 17 allowing the forced convection of the cooling air through the exchanger 10 and the system 13 of circulation ducts.

It is worth noting that the exchanger 10 is completed by an additional filament resistance 171 to bring a complement of thermal energy to the air when needed if the temperature of the lubricating fluid is in particular, too low for the de-icing needs.

As will be seen in a subsequent form, this resistance 171 may be an off-system from the exchanger 10 and placed in another place on the circulation duct, in particular on the de-icing loop 13b of the air inlet 6.

Figure 2:
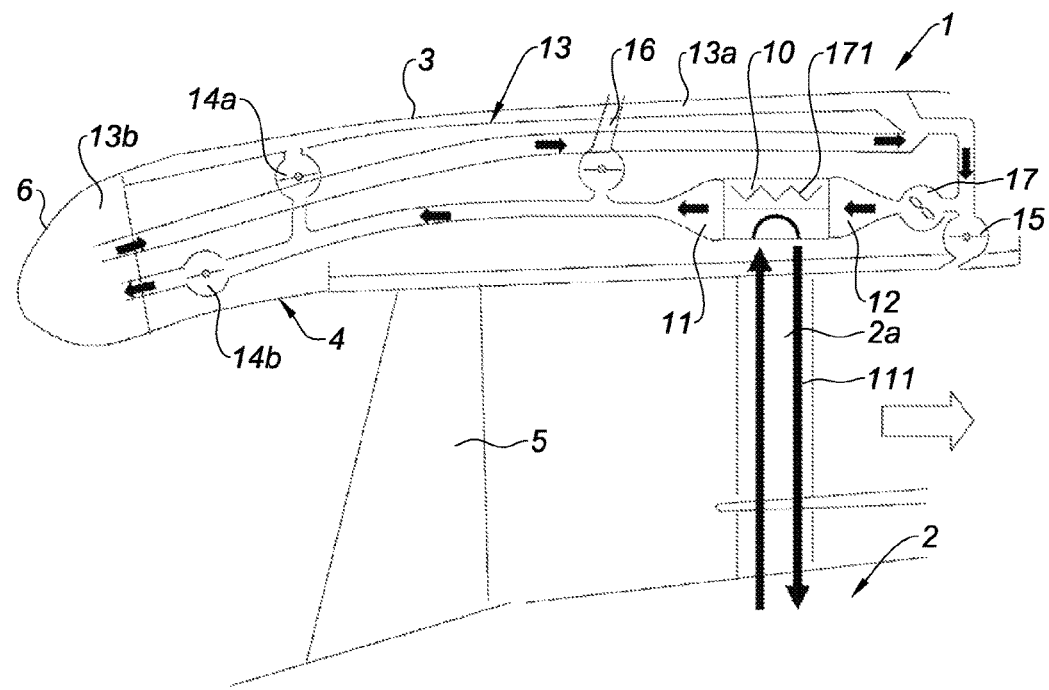
FIGS. 2 to 5 represent different circulation modes of the first fluid through the cooling circuit of the nacelle of FIG. 1.

The FIG. 2 shows the circulation of the cooling air when the circulation system 13 is in the de-icing mode of the air inlet lip 6.

In such a mode, and more usually in cruising flight, the circulation system 13 operates in closed circuit, and the collecting 15 and outlet 16 scoops are closed.

The valve 14b for regulating the de-icing circuit is open, while the valve 14a of the circulation area 13a along the outer fairing 3 is closed.

Figure 3:
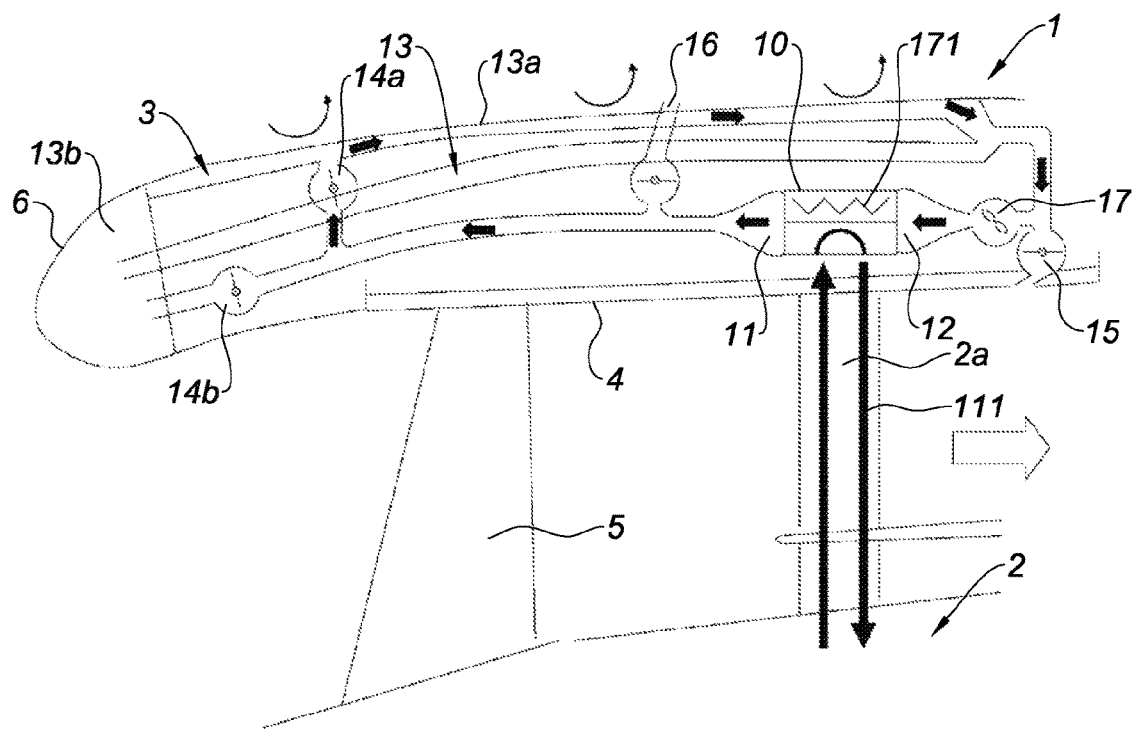

FIG. 3 shows the circulation of the cooling air when the circulation system 13 is in non-de-icing mode of the air inlet lip 6.

In such a mode, the circulation system 13 operates in closed circuit, and the collecting 15 and outlet 16 scoops are closed.

The valve 14b for regulating the de-icing circuit is closed, while the valve 14a of the recirculation area 13a along the outer fairing 3 is open.

Figure 4:
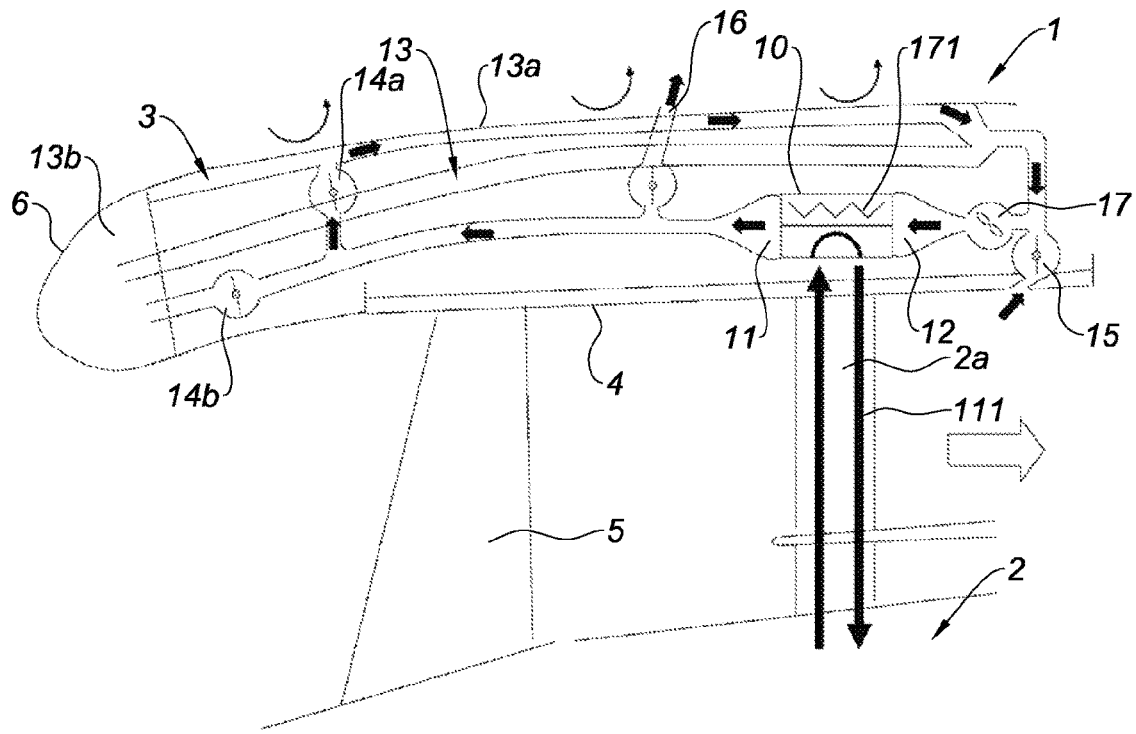

FIG. 4 shows the circulation of the cooling air upon take-off (high external temperature).

In such a mode, the circulation system 13 operates in open circuit and the collecting 15 and outlet 16 scoops are open. The ventilator 17 is active.

The valve 14b for regulating the de-icing circuit is closed while the valve 14a of the recirculation area 13a along the outer fairing 3 is open.

Figure 5:
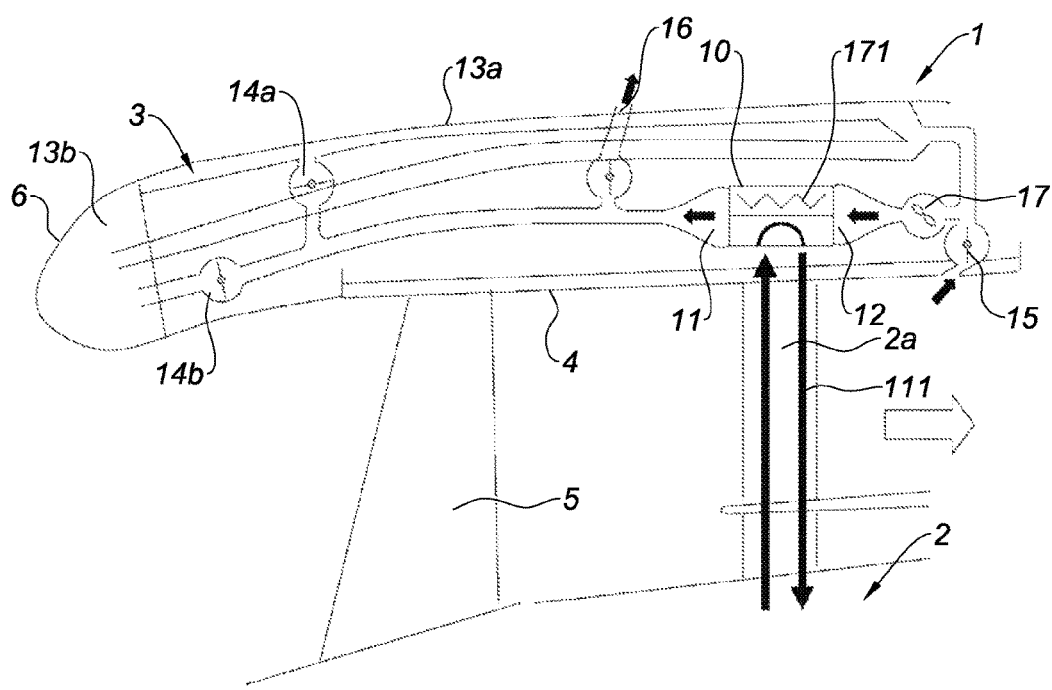

FIG. 5 shows the circulation of the cooling air during ground idle operation (high external temperature, air velocity around the nacelle low or null and low turbine engine power).

In such a mode, the circulation system 13 operates in open circuit and the collecting 15 and outlet 16 scoops are open. The ventilator 17 is active in order to increase the flow rate of the cooling air circulating through the exchanger 10.

The valve 14b for regulating the de-icing circuit is closed as well as the valve 14a of the recirculation area 13a along the outer fairing 3.

The operating in closed circuit allows limiting the aerodynamic disruptions due to the collecting and discharge of the air. During cruising in particular, where the outer velocity of the air is sufficient and the outside temperature is sufficiently low for providing the necessary exchanges, it is not necessary to collect additional air. This allows preventing excess consumption of the turbine engine due to the losses on the compressors or the fan.

Reciprocally, upon take-off, where the power of the turbine engine is at its maximum and where the aerodynamic disruptions have less impact, a maximum collection of air may be carried out.

At ground idle, the ventilator 17 will be activated in order to increase the air flow rate crossing the exchanger and thereby the cooling capacity of the lubricant. In the case of collecting air, the ventilator 17 will also increase the collected air flow rate.

It is worth noting that in case of blockage of the de-icing valve 14b, the temperature of the de-icing air delivered by the exchanger 10 will not exceed the maximum temperature of the lubricant, namely around 180° C. This allows limiting the excess temperatures witnessed by the lip 6 and increasing its service life.

The different operating modes may be given by way of example and the valves, 14a, 14b, scoops 15, 16, circulation ducts 13a, 13b, ventilator 17 and resistance 171 may be activated or not independently and combined according to the de-icing, thermal dissipation and lubricant cooling needs, etc.

FIG. 6 shows a wall of the outer fairing 3 in the form of a dual wall defining an internal space (arrow) inside which a flow of air to be cooled may circulate. The internal space of this dual wall thus constitutes a circulation area extending at least partially along the outer fairing and allows an exchange of heat by conduction with the air outside the nacelle.

FIG. 7 is a sectional view of the wall of FIG. 6. In order to provide the hold of the dual wall and the maintaining of the circulation space, it is provided internal stiffeners 35.

Figure 8:
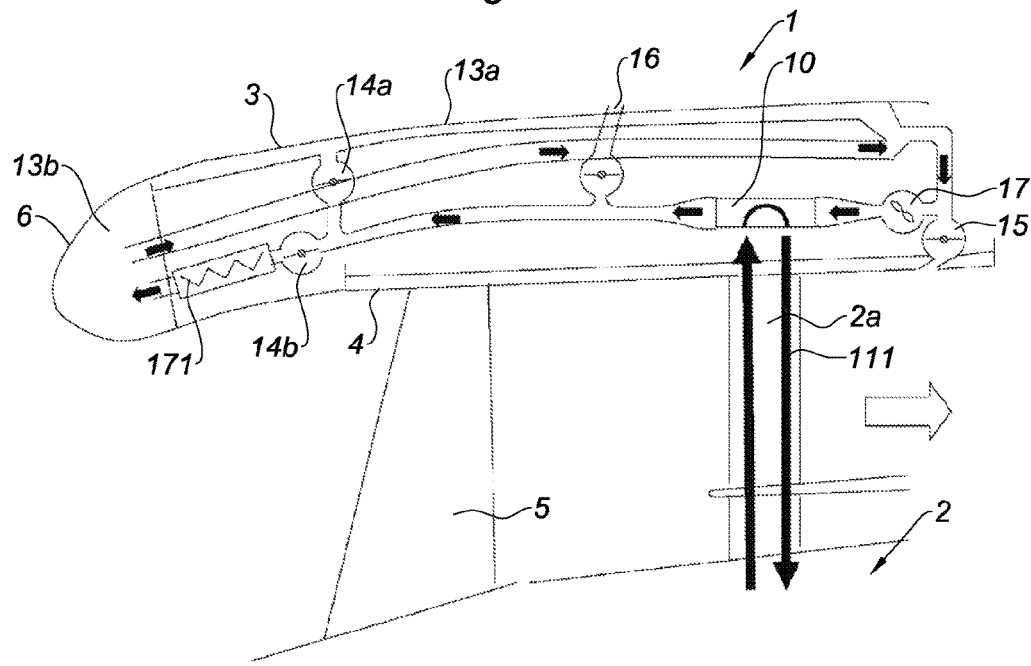
FIG. 8 is a schematic representation of an upstream portion of a nacelle of a turbojet engine according to one form of the present disclosure.

FIG. 8 shows one form in which the additional filament resistance 171 is off system on the circulation loop 13b of de-icing of air inlet lip 6. It is located after the valve 14b and before the de-icing chamber of the lip 6.

Figure 9:
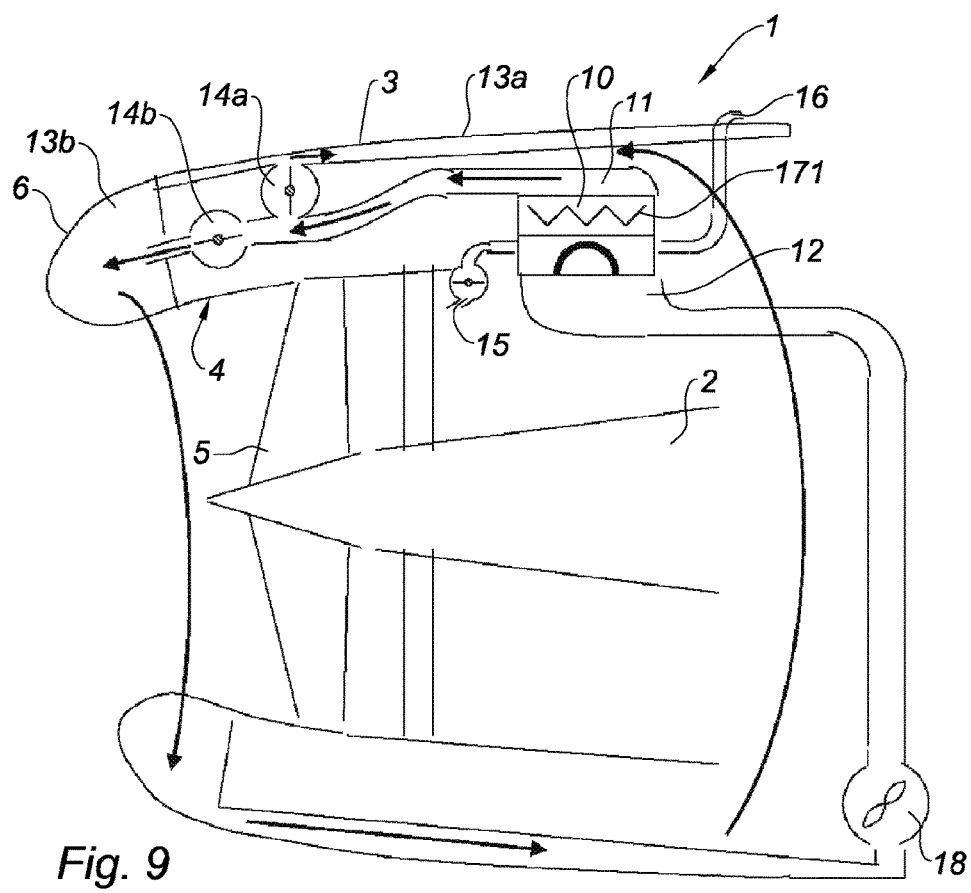
FIG. 9 is a schematic representation of an upstream portion of a nacelle of a turbojet engine according to another form of the present disclosure, in which the first fluid is a liquid being subjected to a phase change during its circulation.

FIG. 9 shows another form in which a liquid is used instead of air as cooling fluid. Furthermore, the liquid is subjected to a phase change during the cycle thereof.

More precisely, the motor lubricant is cooled in the exchanger 10 and leaves its heat to the cooling liquid.

The cooling liquid is chosen in such a manner that this collected heat causes it to evaporate before circulation through the system 13 of circulation ducts.

During its circulation, the evaporated cooling liquid is cooled, either at the outer fairing 3 in accordance with the present disclosure, or for example, at the air inlet lip 6 passing through its de-icing chamber.

In doing so, the evaporated cooling liquid is re-condensed and gravity pulls it to the bottom of the nacelle where it is then pumped by a pump 18 to be sent to the exchanger.

The same applies for the fluid circulating in the dual wall 13a.

The circulation of the cooling liquid is hence carried out in closed circuit.

The fact that the liquid is subjected to phase changes during the cycle thereof allows it to exchange more quantities of heat and have a high de-icing power for the lip 6 and a more cooling power for the lubricant.

In a complementary manner, the exchanger 10 may remain equipped with additional heating means 17.

Also, in a complementary manner, the exchanger 10 may be a triple exchanger allowing the circulation of cooling make-up air.

Figure 10:
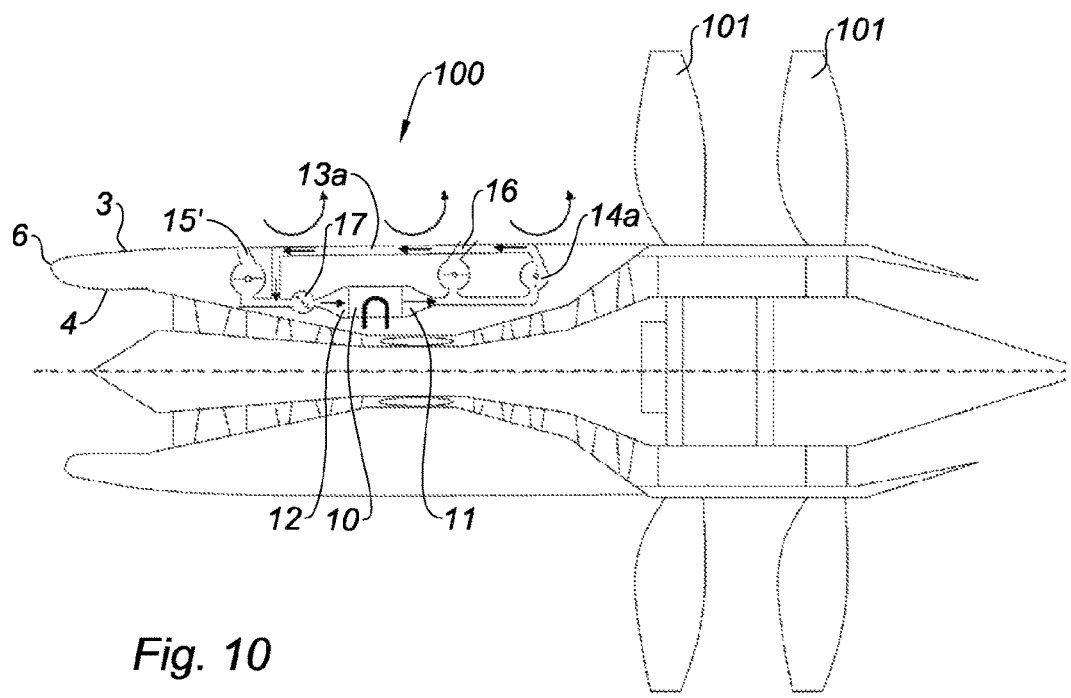
FIGS. 10 to 12 illustrate the implementation of the present disclosure for a nacelle of a turbine engine with propellers.
Figure 11:
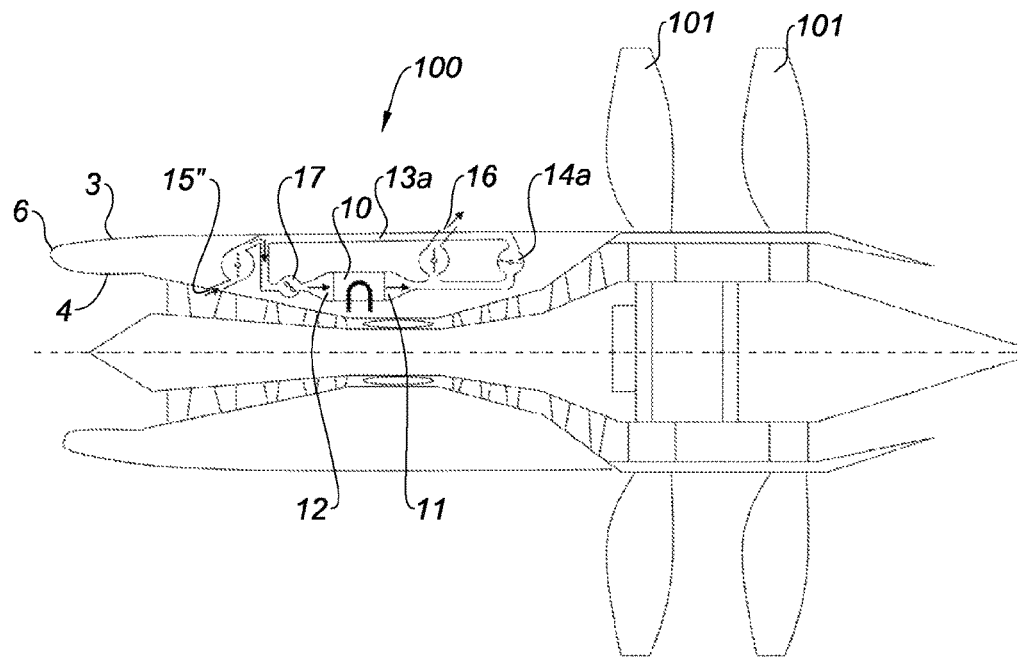
Figure 12:
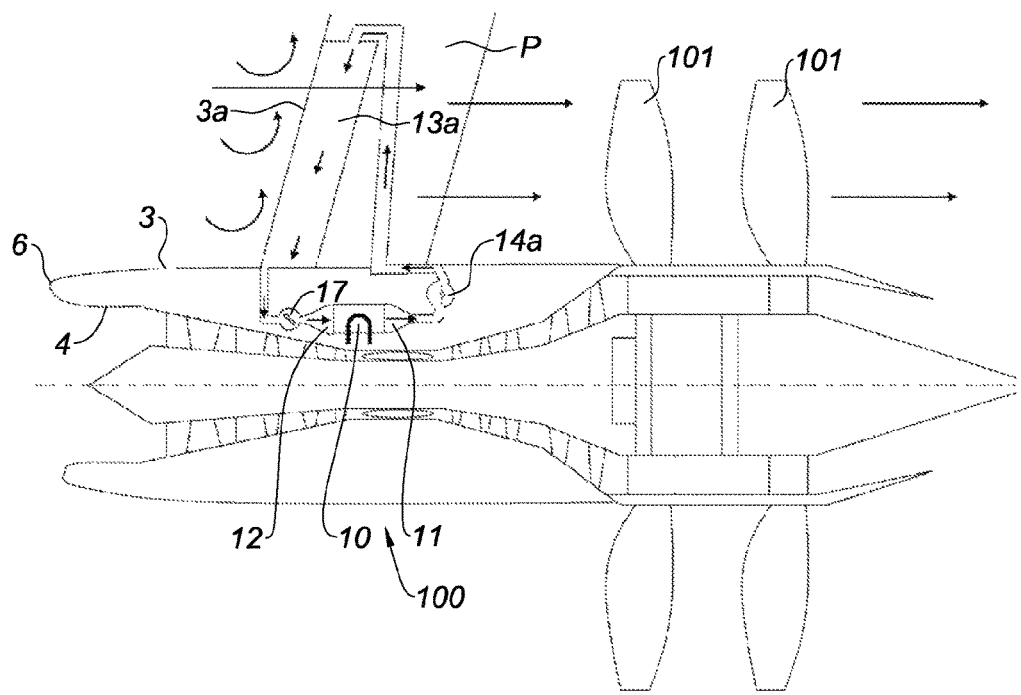

FIGS. 10 to 12 illustrate the implementation of the present disclosure for a nacelle 100 of turbine engine with rear propellers 101.

The cooling device equipping the nacelle of FIG. 10 is similar to the aforementioned devices with the difference that it does not comprise a de-icing circulation duct (but this is possible) and that it comprises an air collecting valve 15' opening into the outer fairing 3.

In the alternative represented in FIG. 11, the collection of air 15" is carried out at the first stages of the compressor of the turbine engine.

During cruising, the operating will be mainly carried out in closed circuit. For the other operating modes, air could be collected from the outside or in the first stages of the compressor.

FIG. 12 shows another form in which the outer fairing 3 of the nacelle comprises an outer fairing 3a of a pylon P of the turbine engine, and the circulation area 13a of the recirculation loop of the first fluid extending at least partially along the outer fairing 3a of the pylon P, for example, on a surface intended to be exposed to the outside flow of air around the nacelle.

This also allows in particular using the suction of the propellers 101 in order to obtain an important cooling of the cooling air of the lubricant including during ground idle.

Thus, it may not be necessary to provide a collecting and discharge of air. The device for cooling the lubricant may thus operate in closed circuit and does not send hot air towards the blades of the propellers.

Although the present disclosure has been described with a particular form example, it is obvious that it is in no way limited thereto and that it includes all the technical equivalents of the means described, as well as their combinations should these fall within the scope of the present disclosure.

What is claimed is:

1. A nacelle of a turbine engine having a tubular structure, comprising:
    at least one outer fairing defining an outer aerodynamic surface;
    at least one inner fairing defining an internal aerodynamic flow surface, said outer aerodynamic surface of the at least one outer fairing and said internal aerodynamic flow surface of the at least one inner fairing being connected upstream by a leading edge wall forming an air inlet lip;
    at least one heat exchanger for exchanging heat between a first fluid to be heated and a second fluid to be cooled, the at least one heat exchanger being disposed between the at least one outer fairing and the at least one inner fairing; and
    at least one circulation duct of the first fluid,
    wherein the at least one circulation duct of the first fluid forms at least one recirculation loop through said at least one heat exchanger, the at least one recirculation loop comprising at least one circulation area of the first fluid extending at least partially along the at least one outer fairing in contact with at least one wall of said at least one outer fairing, wherein said at least one circulation area extends along an internal surface of the at least one outer fairing to allow a heat exchange by conduction with outside air of the nacelle,
    wherein said at least one circulation duct of the first fluid is equipped with at least one regulating valve.

2. The nacelle according to claim 1, wherein said at least one circulation duct of the first fluid is equipped with forced circulation means of said first fluid.

3. The nacelle according to claim 1, further comprising a circulation loop of the first fluid through at least one de-icing chamber of the air inlet lip.

4. The nacelle according to claim 3, wherein said circulation loop of the first fluid comprises at least one recirculation portion through said at least one heat exchanger.

5. The nacelle according to claim 1, further comprising at least one complementary means for heating the first fluid.

6. The nacelle according to claim 5, wherein said at least one complementary means for heating is located at said at least one heat exchanger.

7. The nacelle according to claim 5, wherein said at least one complementary means for heating is disposed at said at least one circulation duct of the first fluid.

8. The nacelle according to claim 1, wherein the first fluid is air, and said at least one heat exchanger is either an air or an oil type exchanger.

9. The nacelle according to claim 1, wherein said second fluid is a motor lubricant of said turbine engine.

10. The nacelle according to claim 1, wherein the first fluid is a liquid.

11. The nacelle according to claim 10, wherein the first fluid undergoes at least one phase change during circulation thereof.

12. The nacelle according to claim 8, wherein said at least one circulation duct of the first fluid comprises at least one means for collecting the first fluid.

13. The nacelle according to claim 12, wherein said at least one circulation duct of the first fluid comprises at least one means for discharging the first fluid.

14. The nacelle according to claim 13, wherein said at least one means for discharging the first fluid is an outlet scoop equipped with at least one regulating valve.

15. The nacelle according to claim 12, wherein said at least one means for collecting the first fluid is a collecting scoop equipped with at least one regulating valve.

16. The nacelle according to claim 15, wherein said collecting scoop is located in a position selected from the group consisting of a downstream position of a fan of the turbine engine and a downstream position of one of a plurality of first stages of a compressor of the turbine engine.

17. The nacelle according to claim 1, wherein said at least one circulation area of the recirculation loop of the first fluid extends at least partially along the at least one outer fairing of a pylon connecting the turbine engine to an aircraft on a surface being exposed to a flow of the outside air around the nacelle.

18. An aircraft propulsion assembly comprising the turbine engine housed inside the nacelle according to claim 1.

* * * * *

UNITED STATES PATENT AND TRADEMARK OFFICE
CERTIFICATE OF CORRECTION

PATENT NO. : 10,294,822 B2  
APPLICATION NO. : 14/471323  
DATED : May 21, 2019  
INVENTOR(S) : Pierre Caruel et al.

Page 1 of 1

It is certified that error appears in the above-identified patent and that said Letters Patent is hereby corrected as shown below:

On the Title Page

Replace -- "(63) Continuation of application No. PCT/FR2013/050290, filed on Feb. 13, 2014."  
With -- "(63) Continuation of application No. PCT/FR2013/050290, filed on Feb. 13, 2013."

Signed and Sealed this  
Twenty-fifth Day of June, 2019

Andrei Iancu  
*Director of the United States Patent and Trademark Office*